United States Patent
Pabla et al.

(10) Patent No.: US 9,139,477 B2
(45) Date of Patent: Sep. 22, 2015

(54) CERAMIC POWDERS AND METHODS THEREFOR

(71) Applicant: General Electric Company, Schenectady, NY (US)

(72) Inventors: Surinder Singh Pabla, Greer, SC (US); Joshua Lee Margolies, Niskayuna, NY (US); Padmaja Parakala, Bangalore (IN)

(73) Assignee: General Electric Company, Schenectady, NY (US)

( * ) Notice: Subject to any disclaimer, the term of this patent is extended or adjusted under 35 U.S.C. 154(b) by 259 days.

(21) Appl. No.: 13/769,538

(22) Filed: Feb. 18, 2013

(65) Prior Publication Data
US 2014/0235426 A1    Aug. 21, 2014

(51) Int. Cl.
*C04B 35/48*    (2006.01)
*C04B 35/49*    (2006.01)
*C04B 35/628*   (2006.01)
(Continued)

(52) U.S. Cl.
CPC ............... *C04B 35/48* (2013.01); *C04B 35/50* (2013.01); *C04B 35/628* (2013.01); *C04B 35/62655* (2013.01); *C04B 35/62805* (2013.01); *C04B 35/62815* (2013.01); *C04B 35/62823* (2013.01); *C04B 35/62884* (2013.01); *C04B 35/632* (2013.01); *C23C 4/00* (2013.01); *C04B 2235/3224* (2013.01); *C04B 2235/3227* (2013.01); *C04B 2235/3244* (2013.01); *C04B 2235/5436* (2013.01); *F01D 5/288* (2013.01); *F05D 2300/2118* (2013.01); *F05D 2300/6033* (2013.01)

(58) Field of Classification Search
CPC .... C04B 35/447; C04B 35/486; C04B 35/48; C04B 35/119; C04B 35/484
USPC .................. 501/102, 103, 104, 105
See application file for complete search history.

(56) References Cited

U.S. PATENT DOCUMENTS 6,306,515 B1   10/2001   Goedjen et al.
6,756,119 B1    6/2004   Clough
(Continued)

FOREIGN PATENT DOCUMENTS

EP    1642993        10/2005
JP    2006298695      4/2005
WO    2008060699      5/2007

OTHER PUBLICATIONS

Liu et al. La2O3-modified YSZ coatings: High-temperature stability and improved thermal barrier properties. Surface & Coatings Technology 203 (2009) 1014-1019.*

(Continued)

*Primary Examiner* — Noah Wiese
(74) *Attorney, Agent, or Firm* — Ernest G. Cusick; Gary M. Hartman; Domernica N. S. Hartman

(57) ABSTRACT

A ceramic powder and method of forming the ceramic powder capable of being used in coatings to allow components to survive in high temperatures environments, such as the hostile thermal environment of a gas turbine engine. The ceramic powder includes powder particles each having an inner core formed of a first material and an outer region formed of a second material. The inner core has a lower thermal conductivity than the outer region, and the outer region is more erosion resistance relative to the inner core.

18 Claims, 5 Drawing Sheets

(51) Int. Cl.
*C23C 4/00* (2006.01)
*C04B 35/50* (2006.01)
*C04B 35/626* (2006.01)
*C04B 35/632* (2006.01)
*F01D 5/28* (2006.01)

(56) References Cited

U.S. PATENT DOCUMENTS

| | | |
|---|---|---|
| 2004/0033884 A1 | 2/2004 | Waller |
| 2004/0106015 A1 | 6/2004 | Damani et al. |
| 2004/0197580 A1 | 10/2004 | Dorfman et al. |
| 2006/0019119 A1 | 1/2006 | Spitsberg et al. |
| 2006/0040127 A1 | 2/2006 | Spitsberg et al. |
| 2007/0151481 A1 | 7/2007 | Akiyama et al. |
| 2008/0113218 A1 | 5/2008 | Schlichting et al. |
| 2009/0311508 A1 | 12/2009 | Stamm et al. |
| 2009/0324989 A1 | 12/2009 | Witz et al. |
| 2010/0048076 A1* | 2/2010 | Creyghton et al. ........... 442/135 |
| 2010/0130346 A1* | 5/2010 | Laine et al. .................. 501/105 |
| 2010/0330282 A1 | 12/2010 | Nienburg et al. |
| 2011/0094416 A1* | 4/2011 | Kawai et al. ............... 106/287.1 |

OTHER PUBLICATIONS

Fornarini et al. Experimental determination of La2O3 thermal conductivity and its application to the thermal analysis of a-Ge/La2O3/c-Si laser annealing. Thin Solid Films 516 (2008) 7400-7405.*

European Search Report issued in connection with corresponding EP Application No. 14153742.3 on May 27, 2014.

* cited by examiner

CERAMIC POWDERS AND METHODS THEREFOR

BACKGROUND OF THE INVENTION

The present invention generally relates to ceramic powders for forming coatings on components exposed to high temperatures, such as the hostile thermal environments of gas turbines. More particularly, this invention is directed to a ceramic powder having improved thermal insulation and erosion resistance properties for applications such as thermal barrier coatings (TBCs).

Improvements are continuously sought to increase the operating temperatures of gas turbines to achieve higher energy output and efficiencies. As a consequence of the higher operating temperatures, hot gas path (HGP) components within turbines are required to withstand the ever increasing temperatures. Often, hot gas path components are expected to operate at temperatures near their melting point. Consequently, complex cooling processes and improved materials are used to mitigate damage to the hot gas path components. In many instances, circumstances may necessitate further increasing the operating temperature of hot gas path components by depositing a thermal barrier coating on their exterior surfaces that are directly exposed to the hot gas path. The use of thermal barrier coatings (TBCs) on components such as combustors, high pressure turbine (HPT) blades, vanes and shrouds is increasing in commercial as well as military gas turbine engines. The thermal insulation provided by a TBC enables such components to survive higher operating temperatures, increases component durability, and improves engine reliability. TBCs are typically formed of a ceramic material and deposited on an environmentally-protective bond coat to form what is termed a TBC system.

Notable examples of ceramic materials for TBCs include zirconia partially or fully stabilized with yttria (yttrium oxide; $Y_2O_3$) or another oxide, such as magnesia, ceria, scandia and/or calcia, and optionally other oxides to reduce thermal conductivity. Binary yttria-stabilized zirconia (YSZ) is widely used as a TBC material because of its high temperature capability, low thermal conductivity, and relative ease of deposition. Zirconia is stabilized to inhibit a tetragonal to monoclinic crystal phase transformation at about 1000° C., which results in a volume change that can cause spallation. At room temperature, the more stable tetragonal phase is obtained and the monoclinic phase is minimized if zirconia is stabilized by at least about six weight percent yttria. A stabilizer (e.g., yttria) content of seventeen weight percent or more ensures a fully stable cubic crystal phase. The conventional practice has been to partially stabilize zirconia with six to eight weight percent yttria (6-8% YSZ) to obtain a TBC that is adherent and spallation-resistant when subjected to high temperature thermal cycling. Furthermore, partially stabilized YSZ (e.g., 6-8% YSZ) is known to be more erosion resistant than fully stabilized YSZ (e.g., 20% YSZ).

Various processes can be used to deposit TBC materials, including thermal spray processes such as air plasma spraying (APS), vacuum plasma spraying (VPS), low pressure plasma spraying (LPPS), and high velocity oxy-fuel (HVOF). TBCs employed in the highest temperature regions of gas turbine engines are often deposited by a physical vapor deposition (PVD), and particularly electron beam physical vapor deposition (EBPVD), which yields a columnar, strain-tolerant grain structure that is able to expand and contract without causing damaging stresses that lead to spallation. Similar columnar microstructures can be produced using other atomic and molecular vapor processes, such as sputtering (e.g., high and low pressure, standard or collimated plume), ion plasma/cathodic arc deposition, and all forms of melting and evaporation deposition processes (e.g., laser melting, etc.). TBCs formed by the various methods noted above generally have a lower thermal conductivity than a dense ceramic of the same composition as a result of the presence of microstructural defects and pores at and between grain boundaries of the TBC microstructure.

In order to improve TBC coatings, composite or clad powders have been developed which comprise more than one material wherein each material offers its own inherent material benefits. For example, the powder may be a metal-ceramic composite comprising a ductile metal matrix and a hard, wear resistant carbide phase. Alternatively, the powder may be a ceramic-polymer composite comprising either ceramic grains encapsulated in a polymer or a polymer encapsulated in a ceramic. The polymer material may be removed through oxidization of the resulting coating after consolidation. Removal of the polymer material yields an open porosity within the coating allowing the ceramic to be compliant in a turbine blade rub event. However, composite powders formed of more than one ceramic material are difficult to reliably form due to processing limitations.

In view of the above, it can be appreciated that improved coating materials are continuously sought in order to allow components to be capable of operating in higher temperature environments.

BRIEF DESCRIPTION OF THE INVENTION

The present invention provides ceramic powders and methods of forming ceramic powders that are capable of being used to form coatings to enable components to survive in high temperatures environments, such as the hostile thermal environment of a gas turbine.

According to a first aspect of the invention, a ceramic powder includes powder particles having an inner core formed of a first material and an outer region formed of a second material on the surface of the inner core. The inner core has a lower thermal conductivity than the outer region and the outer region is more erosion resistant relative to the inner core.

According to a second aspect of the invention, a method is provided for forming a ceramic powder. The method includes forming cores of the powder particles of a first material. The cores are then surface coated to form outer regions of a second material on the cores and yield powder particles. Each of the cores has a lower thermal conductivity than the outer region thereof, and each of the outer regions is more erosion resistant relative to the core thereof.

A technical effect of the invention is the ability to form tailored ceramic powders that are capable of being deposited to form a coating on a component and enable the component to withstand higher temperatures. In particular, it is believed that thermal barrier coatings (TBC) formed from the ceramic powders are capable of exhibiting both low thermal conductivity and improved erosion resistance.

Other aspects and advantages of this invention will be better appreciated from the following detailed description.

DETAILED DESCRIPTION OF THE INVENTION

The present invention is generally applicable to components subjected to high temperatures, and particularly to components such as high and low pressure turbine vanes (nozzles) and blades (buckets), shrouds, combustor liners and augmentor hardware of gas turbine engines. The invention provides ceramic powders, methods of forming ceramic powders, and coating systems that can be formed with the ceramic powders and are suitable for protecting the surfaces of gas turbine engine components that are subjected to hot combustion gases. While advantages of this invention will be described with reference to gas turbine engine components, the teachings of the invention are generally applicable to any component on which a coating system may be used to protect the component from a high temperature environment.

Figure 1:
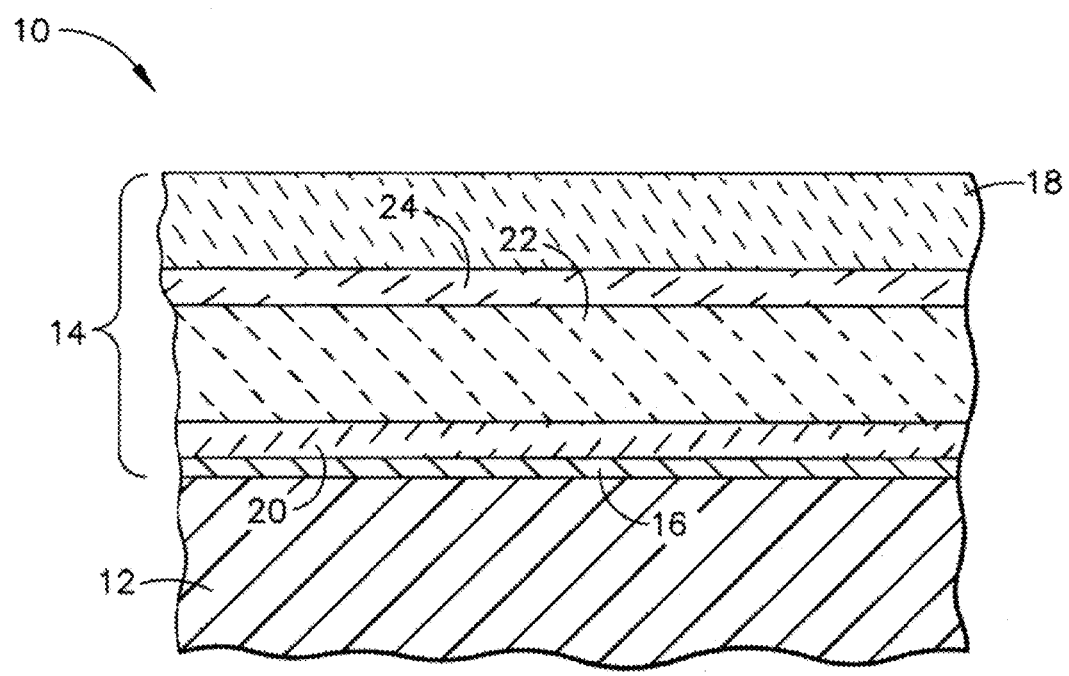
FIG. 1 schematically represents a cross-section through a coating system in accordance with an aspect of this invention.
Figure 2:
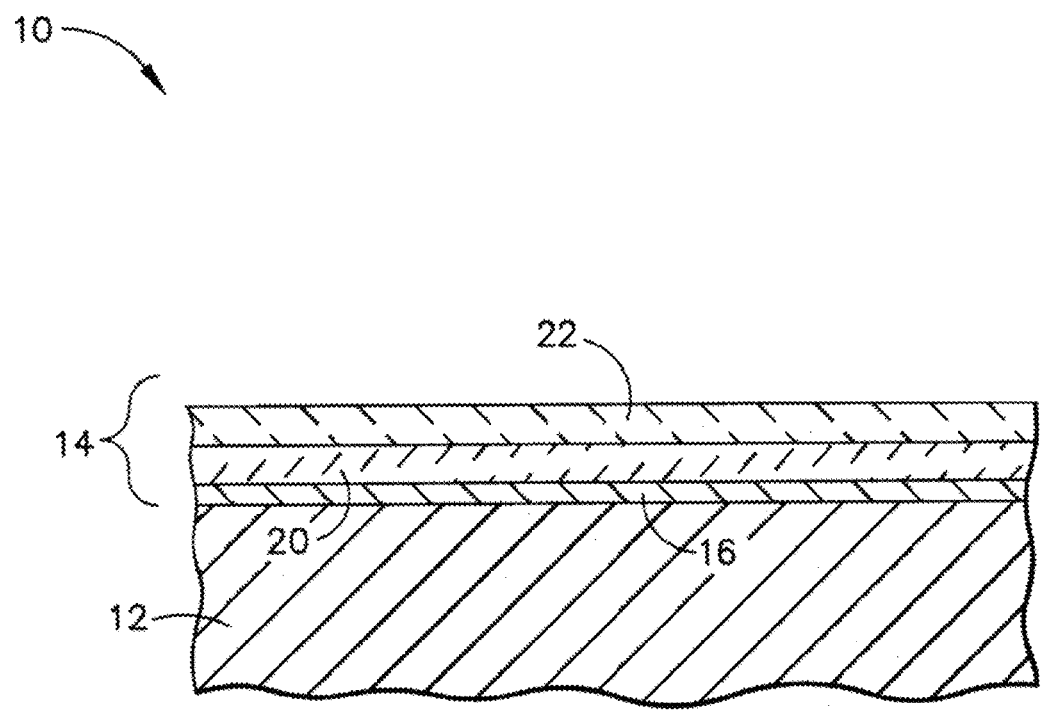
FIG. 2 schematically represents a cross-section through a coating system in accordance with another aspect of this invention.

In accordance with a first embodiment of the invention, a multi-layer thermal barrier coating system 14 is schematically represented in FIG. 1. As shown, a substrate (surface region) 12 of a component 10 is protected by the coating system 14. The coating system 14 reduces the operating temperature of the component 10, thereby enabling the component 10 to survive within higher temperature environments than otherwise possible. While the coating system 14 is represented in FIG. 1 as containing each of multiple layers 16, 18, 20, 22 and 24 whose compositions and functions will be discussed below, it will become apparent from the following discussion that one or more of these layers could be omitted from the coating system 14. As such, the coating system 14 of FIG. 1 represents one of a variety of different coating systems within the scope of the invention. For example, FIG. 2 represents a multi-layer thermal coating system 14 without layers 18 or 24.

An interior layer 22 of the coating system 14 represented in FIG. 1 will be referred to as a thermal barrier coating (TBC) 22 that is adhered to the substrate 12 by a bond coat 16 directly applied to the substrate 12. Other optional layers represented in FIG. 1 include an intermediate layer 20 between the TBC 22 and bond coat 16, an erosion barrier coating 18 that is deposited as the outermost layer of the component 10, and a transitional layer 24 between the TBC 22 and erosion barrier coating 18.

As noted above, the bond coat 16 of the coating system 14 serves to adhere the other layers 18, 20, 22, and 24 to the substrate 12. The bond coat 16 may be an aluminum-rich composition of a type typically used with TBC systems for gas turbine engine components, such as an overlay coating of an MCrAlX alloy or a diffusion coating such as a diffusion aluminide (including diffusion aluminide coatings modified by a precious metal, for example, platinum) of a type known in the art. A particular example is a NiCrAlY composition of a type known in the art. A suitable thickness for the bond coat 16 is about 0.007 inch (about 175 micrometers), though lesser and greater thicknesses are foreseeable and within the scope of the invention as long as the bond coat 16 is capable of providing the desired functions of protecting the substrate 12 and anchoring the TBC system 14. Aluminum-rich bond coats of the types noted above develop an aluminum oxide (alumina) scale (not shown), which is thermally grown by oxidation of the bond coat 16.

The TBC 22 is employed to protect the substrate 12 it covers from high operating temperatures. Hot gas path (HGP) components such as buckets, nozzles, and shrouds in turbine engines burning liquid fuels are often protected by thermal barrier coatings (TBCs). According to a preferred aspect of the invention discussed in more detail below, the TBC 22 preferably contains a material having a relatively low thermal conductivity compared to traditional partially stabilized YSZ (e.g., 6-8% YSZ) coatings known in the art. Increased thermal insulation properties reduce instability of the coating system 14 at higher temperatures thereby allowing higher efficiency with increased reliability and therefore a longer coating system life span. According to another preferred aspect of the invention, the TBC 22 is deposited from a powder preferably by a thermal spraying process, such as air plasma spraying (APS). A suitable thickness range for the TBC 22 is about 125 to about 1600 micrometers, depending on the particular application, though lesser and greater thicknesses are foreseeable and within the scope of the invention.

The erosion barrier coating 18 may be provided to further protect the component 10 and the underlying layers 16, 20, 22, and 24 from solid particle erosion and foreign object damage during operation. The erosion barrier coating 18 can be formed of any suitable erosion-resistant material known in the art, but in preferred embodiments is formed of a constituent of the powder used to form the TBC 22, as will be discussed below. A suitable thickness range for the erosion barrier coating 18 is about 100 to about 400 micrometers, depending on the particular application, though lesser and greater thicknesses are foreseeable and within the scope of the invention.

The intermediate layer 20 is optional but useful in certain applications to promote the adhesion of the TBC 22 to the bond coat 16 and the underlying substrate 12 of the component 10. Suitable materials for the intermediate layer 20 will depend on the particular compositions of the bond coat 16 and TBC 22, though notable materials include zirconia partially or fully stabilized with yttria (YSZ) or another oxide such as magnesia, ceria, scandia and/or calcia, and optionally other oxides to reduce thermal conductivity. A suitable thickness range for the intermediate layer 20 is about 50 to about 150 micrometers, depending on the particular application, though lesser and greater thicknesses are foreseeable and within the scope of the invention.

The transitional layer 24 is another optional layer of the coating system 14 that, if present, may be used to mitigate a potential CTE mismatch between the TBC 22 and the erosion barrier coating 18, and/or inhibit reactions between the TBC 22 and erosion barrier coating 18. Suitable materials for the transitional layer 24 will depend on the particular compositions of the TBC 22 and erosion barrier coating 18, though notable materials include zirconia partially or fully stabilized with yttria (YSZ) or another oxide such as magnesia, ceria, scandia and/or calcia, and optionally other oxides to reduce thermal conductivity. Suitable thicknesses for the transitional layer 24 will depend on the particular application, though thicknesses in a range of about 20 to about 130 micrometers are typically adequate. Lesser and greater thicknesses for the transitional layer 24 are foreseeable and within the scope of the invention.

Figure 3:
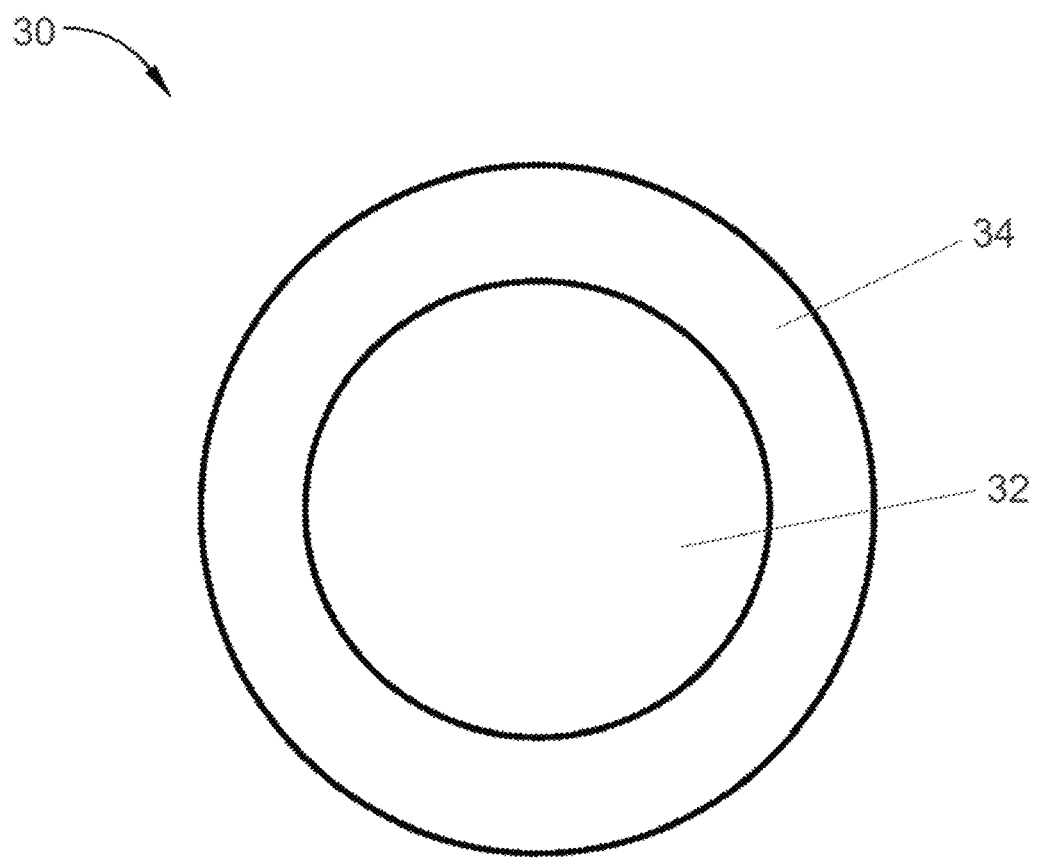
FIG. 3 schematically represents a cross-section through a powder particle that can be produced and used to form coatings in accordance with various aspects of this invention.

According to another aspect of the present invention, particles of the powder used to form the TBC 22 are tailored so that the TBC 22 exhibits a low thermal conductivity and enhanced resistance to erosion. As represented by a powder particle 30 shown in FIG. 3, powder surface properties and grain boundary interactions may be tailored by forming the particle 30 to have an inner core 32 surrounded by and preferably entirely encased within an outer region 34 of the particle 30, wherein the inner core 32 and outer region 34 are formed of different materials. In preferred embodiments, the inner core 32 contains and more preferably is formed entirely of a ceramic composition that has a lower thermal conductivity (K) than a ceramic composition that entirely or at least partially forms the outer region 34 of the particle 30, and the composition of the outer region 34 is more erosion-resistant than the composition that forms the inner core 32. In addition, it is believed that the compositional interfaces between the inner core 32 and the outer region 34 will in itself hinder thermal conduction.

The ceramic composition of the inner core 32 is preferably initially in the form of a particle that can be made by a reverse coprecipitation process. Typical coprecipitation processes are carried out in an initial acidic reaction environment that subsequently changes slowly to basic, whereas reverse coprecipitation processes occur in a constant strong basic reaction environment. Such a reaction environment is believed to allow for improved control of the hydrolysis-complex process, resulting in a better control of morphology, size, crystalline phase and the chemical composition of the final precipitate. For example, oxides with a desired molar ratio may be dissolved in nitric acid (0.1 M) and distilled water at about 90° C. at a pH of about 10 to about 13. Once the reaction is complete, the resulting precipitate may be processed to form the inner core 32 of the powder particle 30. Processing of the precipitate may include filtering, washing with deionized water, calcination, and milling. A powder made up of inner cores 32 formed in this manner may be subsequently blended with an organic binder, such as ethanol and polyethyleneimine, and spray dried at elevated temperatures, such as about 100 to about 150° C., to give the powder a more uniform consistency. Alternatively, the inner cores 32 may be formed by blending sub-micron constituents in a slurry. The slurry may then be spray dried to achieve a desired particle size and sintered for increased strength. Yet another method includes forming the inner cores 32 in an arc fusion process followed by milling the particles to a desired size.

Thereafter, the inner cores 32 are surface coated to form the outer region 34 of each powder particle 30. The inner cores 32 may be coated by a chemical vapor deposition (CVD) process or by blending the inner cores 32 in a slurry comprising the material for the outer region 34, spray drying, and sintering the resulting powder particles 30 for increased strength. A preferred average particle size (as measured along a major axis) of the resulting powder particles 30 will typically depend on the method by which they will be deposited. For example, if the powder particles 30 will be deposited by air plasma spraying (APS), a suitable average particle size is about 10 to about 90 micrometers. If the powder particles 30 will be deposited by solution precursor plasma spraying (SPPS), a suitable average particle size is about 1 to about 15 micrometers. It is believed that smaller particle sizes promote an increased number of splat boundaries per unit length in a coating formed therefrom relative to coatings formed of larger particle sizes, which is believed to enhance strain tolerance, increase crack propagation tortuosity and thus improve fracture toughness and erosion resistance.

The inner core 32 is preferably tailored to have a thermal conductivity up to about 1 $Wm^{-1}k^{-1}$, and more preferably between about 0.5 to about 1 $Wm^{-1}k^{-1}$, and may be formed of various materials including, but not limited to, zirconia ($ZrO_2$) doped with at least two dopants that significantly differ in atomic size and weight, or zirconia doped with ytterbium oxide ($Yb_2O_3$; ytterbia). Compositions having low concentrations of ytterbia are believed to provide decreased thermal conductivity. Yb—Zr-based oxide compositions preferred for the inner core 32 comprise about 20 to about 70 wt. % ytterbia, and more preferably about 45 to about 70 wt. % ytterbia, the balance being zirconia and incidental impurities. As used herein, the term incidental impurities refers to those elements that that may be difficult to completely eliminate from an alloy due to processing limitations, yet are not present in sufficient quantities to significantly alter or degrade the desired properties of the alloy, for example, rare earth oxide impurities having levels of less than about 2 wt. % and other impurities having levels of less than about 0.5 wt. % within the oxide composition.

In the case of zirconia doped with at least two dopants having significantly different atomic sizes and weights, it is believed that by substituting a large ion with another much heavier and smaller ion, the substituted large ion will remain in a relaxed state. The phonon scattering effect is believed to then be due to both localized vibration of the smaller ion and intrinsic oxygen vacancies resulting in an abnormal heat capacity. As an example, the TBC 22 may comprise zirconia doped with ytterbia and lanthanum oxide ($La_2O_3$; lanthana), wherein the contents of ytterbia ($Yb^{3+}$, 0.985 A°) and lanthana ($La^{3+}$, 1.16 A°) are sufficiently high to promote the substitution of Yb3+ and La3+ ions within the material. These Yb—La—Zr-based oxide compositions can be regarded as a solid solution of $Yb^{3+}$ taking the site of $La^{3+}$ in $La_2Zr_2O_7$ ceramics or as $Yb^{3+}$ being substituted by $La^{3+}$ in $Yb_2Zr_2O_7$ ceramics. Preferred Yb—La—Zr-based oxide compositions comprise about 30 to about 40 wt. % ytterbia and about 10 to about 25 wt. % lanthana, the latter of which may be partially or entirely substituted with samarium oxide ($Sm_2O_3$; samaria). Exemplary compositions may further include hafnia ($HfO_2$) and/or tantala ($Ta_2O_5$), a nonlimiting example of which is about 30.5 wt. % ytterbia, about 24.8 wt. % lanthana and/or samaria, about 1.4 wt. % hafnia, about 1.5 wt. % tantala, the balance being zirconia and incidental impurities.

The Yb—La—Zr-based oxide compositions described above for the inner core 32 are characterized by a mixed pyrochlore structure showing significant drop in thermal conductivity. However, such a pyrochlore structure possesses inherently poorer fracture toughness as compared to traditional partially stabilized YSZ (e.g., 6-8% YSZ). Therefore, the outer region 34 is provided to protect the inner core 32 from solid particle erosion and foreign object damage during operation. The outer region 34 deposited on the surface of the inner core 32 may be formed of erosion resistance materials including, but not limited to, zirconia doped with low concentrations of lanthana (below about 20 wt. % lanthana, preferably about 3 to about 10 wt. % lanthana), zirconia doped with low concentrations of ytterbia (below about 10 wt. % ytterbia, preferably about 2 to about 12 wt. % ytterbia), oxides of mischmetal (any alloy of rare earth elements in naturally occurring proportions), zirconia doped with mischmetal (below about 75 wt. % mischmetal), zirconia doped with ytterbia and mischmetal (below about 30 wt. % ytterbia and below about 25 wt. % mischmetal), zirconia doped with high levels of ytterbia (below about 55 wt. % ytterbia), zirconia doped with ytterbia and lanthana (below about 55 wt. % ytterbia and below about 8 wt. % lanthana and/or samaria), and the like. A suitable thickness range for the inner core 32 and the outer region 34 depends on the particular deposition method. For example, for SPPS, the inner core 32 preferably has a diameter or about 5 to about 6 micrometers and the outer region 34 has a thickness of about 1 to about 2 micrometers. For APS, the inner core 32 preferably has a diameter or about 10 to about 60 micrometers and the outer region 34 has a thickness of about 3 to about 30 micrometers. However, lesser and greater thicknesses are foreseeable and within the scope of the invention.

An exemplary powder composition includes powder particles 30 comprising an inner core 32 formed of a composition consisting of about 45 wt. % to about 70 wt. % ytterbia and the balance being zirconia and incidental impurities, and an outer region 34 formed of a composition consisting of about 1 wt. % to about 5 wt. % ytterbia and about 2 wt. % to about 8 wt. % lanthana and the balance being zirconia and incidental impurities. In another example, the powder particles 30 may comprise an inner core 32 formed a composition consisting of about 45 wt. % to about 70 wt. % ytterbia and the balance being zirconia and incidental impurities, and an outer region 34 formed of a composition consisting of about 8 wt. % to about 18 wt. % ytterbia. In another example, the powder particles 30 may comprise an inner core 32 formed of a composition consisting of about 30 wt. % to about 40 wt. % ytterbia, about 10 wt. % to about 25 wt. % lanthana and/or samaria, and the balance being zirconia and incidental impurities, and an outer region 34 formed of a composition consisting of about 8 wt. % to about 18 wt. % ytterbia. In yet another example, the powder particles 30 may comprise an inner core 32 formed of a composition consisting of about 30 wt. % to about 40 wt. % ytterbia, about 10 wt. % to about 25 wt. % lanthana and/or samaria, and the balance being zirconia and incidental impurities, and an outer region 34 formed of a composition consisting of about 25 wt. % to about 75 wt. % mischmetal, and the balance being zirconia and incidental impurities.

Figure 5:
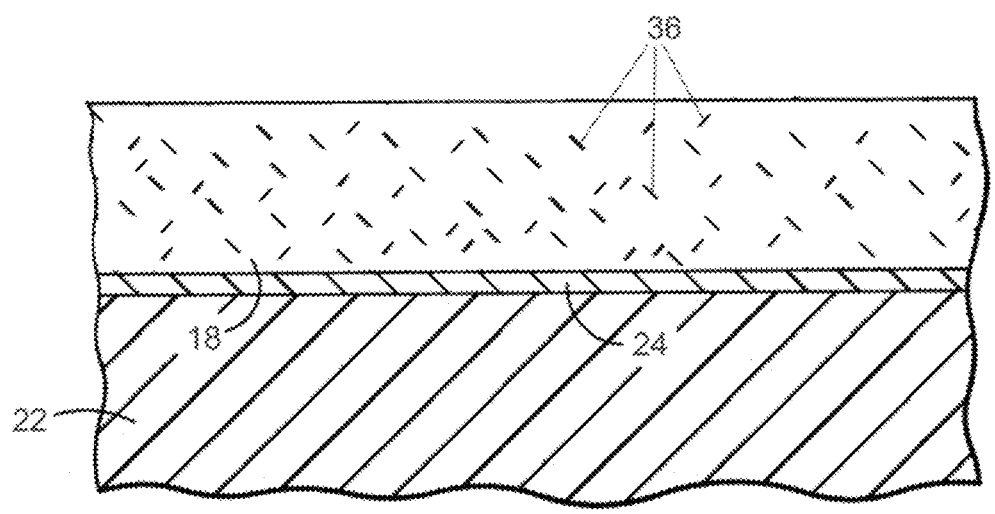
FIG. 5 schematically represents a cross-section through a coating system in accordance with another aspect of this invention.

As previously noted, the optional erosion barrier coating 18 can be formed of one or more of the compositions described above for the outer region 34 of the powder particles 30. As such, the erosion barrier coating 18 may be formed by depositing a powder whose particles are, for example, a Yb—Zr-based oxide composition with low concentrations of ytterbia, a La—Zr-based oxide composition having a low level of lanthana, a Yb—Sm—Zr-based oxide composition having a low level of ytterbia, a mischmetal-based oxide composition, or a Yb—La—Zr-based oxide composition, as described above for the outer regions 34 of the powder particles 30 that are used to form the TBC 22. Alternatively, the erosion barrier coating 18 may be formed of a YSZ composition deposited by, for example, detonation gun thermal spraying or high velocity oxygen and/or air fuel spraying (HVOF/HVAF), or an aluminum oxide or an aluminum oxide doped with titanium deposited, for example, by APS. According to an aspect of the invention, the erosion barrier coating 18 may be formed, for example, by low temperature processes such as SPPS or a sol-gel process to include oxide whiskers (shot fibers) 36 randomly distributed in the erosion barrier coating 18 for improved erosion and oxidation resistance, as schematically represented in FIG. 5 (not to scale). The whiskers 36 are preferably about 1 to about 5 micrometers in diameter and about 5 to about 20 micrometers in length, though lesser and greater diameters and lengths are also within the scope of the invention. The whiskers 36 are randomly distributed throughout the erosion barrier coating 18 having a volume fraction of about 10 to about 40%. The whiskers 36 may be comprised of any suitable oxide such as, but not limited to, aluminum oxide and titanium oxide. A nonlimiting example of oxide whiskers 36 can be found in U.S. Pat. No. 8,272,843 to Ryznic et al., the contents of which relating to the oxide whiskers are incorporated herein by reference.

Once deposited onto a substrate 12 of the component 10, the thermal barrier coating system 14 is believed to provide improved thermal and erosion protection for the substrate 12 that are attributable to the compositions of the inner cores 32 and outer regions 34 of the particles 30 used to form the TBC 22 and, optionally, the erosion barrier coating 18. Suitable methods of depositing the layers 18, 20, 22, and 24 of the above embodiments include, but are not limited to, sol-gel processes, solution plasma spray processes, suspension plasma processes, high velocity air fuel thermal spray processes, high velocity oxy-fuel thermal spray processes, and plasma spraying (air (APS), vacuum (VPS), solution precursor plasma spraying (SPPS), and low pressure (LPPS)). Particularly suitable results have been obtained by depositing the TBC 22 by a thermal spraying process, such as air plasma spraying (APS), by which softened particles deposit as "splats" on the deposition surface formed by the bond coat 16, and result in the TBC 22 having noncolumnar, irregular flattened grains and a degree of inhomogeneity and porosity. This category of thermal barrier coating includes coatings referred to as dense vertically cracked (DVC) TBCs, which are deposited by plasma spraying to have vertical microcracks to improve durability. Such processes and their parameters are disclosed in U.S. Pat. Nos. 5,830,586, 5,897,921, 5,989,343 and 6,047,539. Alternatively, the TBC 22 may be formed to have columnar grains with defined spacing for structural integrity of the TBC 22.

Following the deposition of its layers on the substrate 12, the thermal barrier coating system 14 preferably undergoes heat treatment to relieve residual stresses. An exemplary heat treatment is in a temperature range of about 2000 to about 2100° F. (about 1090 to about 1150° C.) in a vacuum for a duration of about two to about four hours. A particularly preferred heat treatment is believed to be about 2050° F. (about 1120° C.) in a vacuum for about two hours. This disclosed heat treatment is merely exemplary and other effective heat treatments may be employed.

Figure 4:
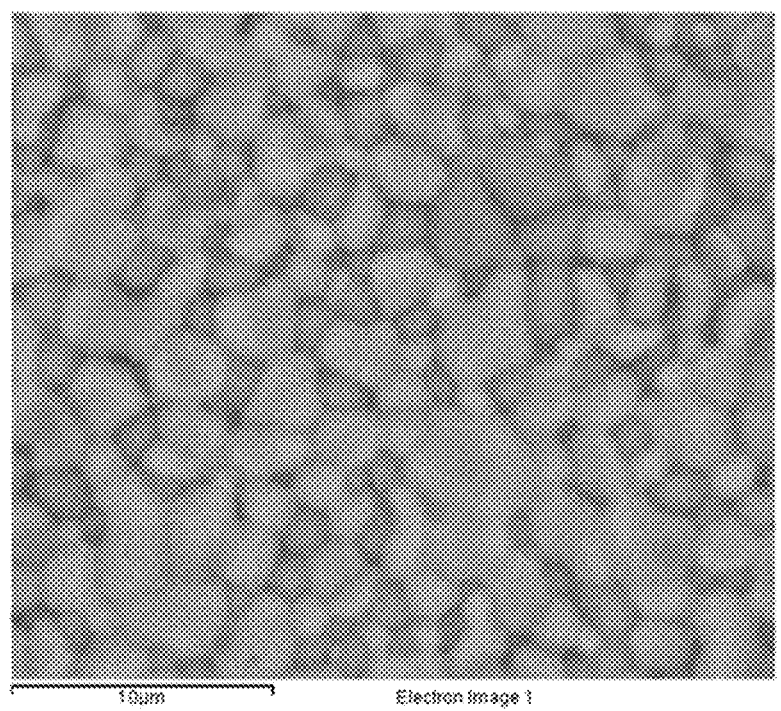
FIG. 4 is a scanned images of a coating system produced by a process within the scope of this invention.

In investigations leading to this invention, layers of Yb—La—Hf—Ta—Zr-based oxide compositions of the type described above and deposited by plasma spraying, such as APS to form DVC TBCs, as well as SPPS were observed to form a well-connected microstructure with isolated pores that were circular in shape. Other dopants, such as hafnia and tantala, were identified at the grain boundaries. Furthermore, the microstructures of the layers comprised Yb—Zr oxide grains surrounded by La—Zr oxide grain boundaries. It is believed that the Yb—Zr oxide grains provide low thermal conductivity properties while the La—Zr oxide grains promote erosion resistance. An exemplary microstructure is shown in FIG. 4. Therein, the darker grains correspond to grains with a relatively higher content of ytterbia and the lighter grains correspond to grains with a relatively higher content of lanthana.

While the invention has been described in terms of specific embodiments, it is apparent that other forms could be adopted by one skilled in the art. For example, the number of layers used could be increased or decreased, and materials and processes other than those noted could be used. Therefore, the scope of the invention is to be limited only by the following claims.

The invention claimed is:

1. A ceramic powder containing powder particles, each of a plurality of the powder particles comprising an inner core formed of a first material and an outer region formed of a second material on the surface of the inner core, wherein the first material of the inner core has a thermal conductivity of about 0.5 to about 1.0 $Wm^{-1}k^{-1}$ and the thermal conductivity of the first material is lower than a thermal conductivity of the second material of the outer region.

2. The ceramic powder of claim 1, wherein the first material of the inner core comprises a composition chosen from the group consisting of Yb—La—Zr-based oxide compositions, Yb—Sm—Zr-based oxide compositions, and Yb—Zr-based oxide compositions.

3. The ceramic powder of claim 1, wherein the second material of the outer region comprises a composition chosen from the group consisting of Yb—Zr-based oxide compositions, La—Zr-based oxide compositions, Yb—La—Zr-based oxide compositions, Yb—Sm—Zr-based oxide compositions, Yb-mischmetal-Zr-based oxide compositions, and mischmetal-Zr-based oxide compositions.

4. The ceramic powder of claim 1, wherein the first material of the inner core consists of about 30 to about 40 wt. % ytterbia, about 10 to about 25 wt. % lanthana and/or samaria, the remainder being zirconia and incidental impurities, and the second material of the outer region consists of:
about 8 to about 18 wt. % ytterbia, with the remainder being zirconia and incidental impurities; or
about 25 to about 75 wt. % mischmetal, with the remainder being zirconia and incidental impurities.

5. The ceramic powder of claim 1, wherein the first material of the inner core consists of about 40 to about 70 wt. % ytterbia, the remainder being zirconia and incidental impurities, and the second material of the outer region consists of:
about 1 to about 5 wt. % ytterbia, about 2 to about 8 wt. % lanthana, with the remainder being zirconia and incidental impurities; or
about 8 to about 18 wt. % ytterbia, with the remainder being zirconia and incidental impurities.

6. A coating system formed from the ceramic powder of claim 1 and disposed on a surface region of a component.

7. A component having the coating system of claim 6 thereon.

8. The component of claim 7, wherein the component is installed in a gas turbine engine.

9. A method of forming a ceramic powder containing powder particles, the method comprising:
forming cores of the powder particles, wherein the cores are formed of a first material having a thermal conductivity of about 0.5 to about 1.0 $Wm^{-1}k^{-1}$; and then
surface coating the cores to form an outer region of the powder particles, wherein each the outer regions is formed of a second material having a thermal conductivity, the thermal conductivity of the first material is lower than the thermal conductivity of the second material.

10. The method of claim 9, wherein the forming step includes forming precipitates by reverse coprecipitation and then processing the precipitates to form the cores.

11. The method of claim 10, further comprising blending the cores with an organic binder and spray drying the cores after the processing step but prior to the surface coating step.

12. The method of claim 9, wherein the surface coating step is performed by a chemical vapor deposition process.

13. The method of claim 9, wherein after the step of surface coating the cores, the powder particles have an average particle size of about 1 to about 90 micrometers.

14. The method of claim 9, wherein the cores consist entirely of the first material.

15. The method of claim 9, wherein the outer regions consist entirely of the second material.

16. The method of claim 9, wherein the first material is chosen from the group consisting of Yb—La—Zr-based oxide compositions, Yb—Sm—Zr-based oxide compositions, and Yb—Zr-based oxide compositions.

17. The method of claim 9, wherein the second material is chosen from the group consisting of Yb—Zr-based oxide compositions, La—Zr-based oxide compositions, Yb—La—Zr-based oxide compositions, Yb—Sm—Zr-based oxide compositions, Yb-mischmetal-Zr-based oxide compositions, and mischmetal-Zr-based oxide compositions.

18. A ceramic powder manufactured by the method of claim 9.

* * * * *